(12) United States Patent
Schiekofer et al.

(10) Patent No.: US 12,276,948 B2
(45) Date of Patent: Apr. 15, 2025

(54) METHOD AND SYSTEM FOR PROVIDING TIME-CRITICAL CONTROL APPLICATIONS

(71) Applicant: Siemens Aktiengesellschaft, Munich (DE)

(72) Inventors: Rainer Schiekofer, Nuremberg (DE); Franz-Josef Götz, Heideck (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/724,282

(22) PCT Filed: Dec. 5, 2022

(86) PCT No.: PCT/EP2022/084397
§ 371 (c)(1),
(2) Date: Jun. 26, 2024

(87) PCT Pub. No.: WO2023/126127
PCT Pub. Date: Jul. 6, 2023

(65) Prior Publication Data
US 2024/0419129 A1   Dec. 19, 2024

(30) Foreign Application Priority Data
Dec. 29, 2021   (EP) .................................... 21218157

(51) Int. Cl.
*G05B 13/02*   (2006.01)
*G05B 13/04*   (2006.01)
(Continued)

(52) U.S. Cl.
CPC ....... *G05B 13/0255* (2013.01); *G05B 13/021* (2013.01); *G05B 13/04* (2013.01);
(Continued)

(58) Field of Classification Search
None
See application file for complete search history.

(56) References Cited

U.S. PATENT DOCUMENTS

| | | | | |
|---|---|---|---|---|
| 7,930,041 B2 * | 4/2011 | Korsberg | ........... | G05B 19/0421 710/110 |
| 9,086,912 B2 * | 7/2015 | Van Kervinck | ........... | G06F 9/48 |

(Continued)

FOREIGN PATENT DOCUMENTS

| | | | | |
|---|---|---|---|---|
| CA | 2612564 A1 * | 9/2005 | ......... | G05B 19/0421 |
| CN | 1653799 | 8/2005 | | |

(Continued)

OTHER PUBLICATIONS

Cheng et al., "Joint optimization of production, quality control and maintenance for serial parallel multistage production systems", Jan. 2020, Reliability Engineering and System Safety 204 (2020) 107146. (Year: 2020).*

(Continued)

*Primary Examiner* — Mohammad Ali
*Assistant Examiner* — Kelvin Booker
(74) *Attorney, Agent, or Firm* — Cozen O'Connor

(57) ABSTRACT

System and method for providing time-critical control applications via flow control components that are each loadable into and executable by a flow control environment formed via a server device, wherein the control applications each periodically determine, from periodically acquired measured and/or state variables, manipulated variables for a process to be controlled or regulated, a plurality of mutually redundant flow control components are executed in parallel with one another, the mutually redundant flow control components determine the manipulated variables for a respective process cycle that follows a respective acquisition time of the measured and/or state variables when a majority of the mutually redundant flow control components signal (Continued)

error-free presence of the measured and/or state variables for the respective acquisition time, where as an alternative or in addition, the determined manipulated variables are transmitted, together with a sequence number assigned to the respective process cycle, to actuators and/or control units.

15 Claims, 2 Drawing Sheets

(51) Int. Cl.
*G05B 19/04* (2006.01)
*G05B 19/41* (2006.01)
*G06F 16/23* (2019.01)
*G06F 16/84* (2019.01)

(52) U.S. Cl.
CPC .............. *G05B 19/04* (2013.01); *G05B 19/41* (2013.01); *G06F 16/23* (2019.01); *G06F 16/86* (2019.01)

(56) References Cited

U.S. PATENT DOCUMENTS

| | | | | |
|---|---|---|---|---|
| 9,432,298 | B1* | 8/2016 | Smith | H04L 49/9057 |
| 11,030,536 | B2* | 6/2021 | Lamparter | G06N 5/022 |
| 11,079,744 | B2 | 8/2021 | Chauvet et al. | |
| 11,188,585 | B2* | 11/2021 | Yanosy, Jr. | G06F 16/86 |
| 2005/0204076 | A1 | 9/2005 | Cumpson et al. | |
| 2010/0082117 | A1* | 4/2010 | Korsberg | G05B 19/4148 700/3 |
| 2015/0081043 | A1* | 3/2015 | Kim | H04L 67/12 700/19 |
| 2016/0019294 | A1* | 1/2016 | Dong | G16H 40/67 707/794 |
| 2016/0147736 | A1* | 5/2016 | Danielyan | G06V 30/414 704/9 |
| 2016/0350364 | A1* | 12/2016 | Anicic | G06F 16/367 |
| 2017/0083547 | A1* | 3/2017 | Tonkin | G06F 16/23 |
| 2020/0134092 | A1* | 4/2020 | Yanosy, Jr. | G06F 16/86 |
| 2020/0211363 | A1 | 7/2020 | Chen et al. | |
| 2020/0233402 | A1* | 7/2020 | Sakic | G05B 19/058 |
| 2022/0137604 | A1 | 5/2022 | Albrecht et al. | |

FOREIGN PATENT DOCUMENTS

| | | | | |
|---|---|---|---|---|
| CN | 106447173 | A * | 2/2017 | ......... G06Q 10/0633 |
| CN | 107947974 | A * | 4/2018 | ......... H04L 41/0677 |
| CN | 110959141 | | 4/2020 | |
| CN | 111740924 | | 10/2020 | |
| CN | 112738125 | | 4/2021 | |
| CN | 113439245 | | 9/2021 | |
| EP | 3101534 | A1 * | 12/2016 | .......... G06F 16/367 |
| EP | 3674824 | | 7/2020 | |
| EP | 3975502 | A1 * | 3/2022 | .............. H04L 47/20 |
| FR | 2907933 | A1 * | 5/2008 | .......... G06F 11/3672 |
| WO | WO-2016165923 | A1 * | 10/2016 | ....... G05B 19/41865 |
| WO | 2017064560 | | 4/2017 | |
| WO | 2019001718 | | 1/2019 | |
| WO | WO-2020104019 | A1 * | 5/2020 | ......... G05B 19/4186 |

OTHER PUBLICATIONS

Ko et al., "Dispatching rule for non-identical parallel machines with sequence-dependent setups and quality restrictions", Sep. 2008, Computers & Industrial Engineering 59 (2010) 448-457. (Year: 2008).*

Ronngren et al., "A Comparative Study of Parallel and Sequential Priority Queue Algorithms", Apr. 1997, ACM Transactions on Modeling and Computer Simulation, vol. 7, No. 2, Apr. 1997, pp. 157-209. (Year: 1997).*

Ding et al., "Parallel machine scheduling with completion-time-based criteria and sequence-dependent deterioration", Nov. 2017, Computers and Operations Research 103 (2019) 35-45. (Year: 2017).*

PCT International Search Report dated Jan. 30, 2023 based on PCT/EP2022/084397 filed Dec. 5, 2022.

* cited by examiner

METHOD AND SYSTEM FOR PROVIDING TIME-CRITICAL CONTROL APPLICATIONS

CROSS-REFERENCE TO RELATED APPLICATIONS

This is a U.S. national stage of application No. PCT/EP2022/084397 filed 5 Dec. 2022. Priority is claimed on European Application No. 21218157.2 filed 29 Dec. 2021, the content of which is incorporated herein by reference in its entirety.

BACKGROUND OF THE INVENTION

1. Field of the Invention

The present invention relates to a system and method for providing time-critical control applications, in particular control applications in an industrial automation system.

2. Description of the Related Art

An industrial automation system usually comprises a multiplicity of automation devices networked to one another via an industrial communication network and is used to control or regulate installations, machines or devices within the scope of manufacturing or process automation. On account of time-critical framework conditions in industrial automation systems, real-time communication protocols, such as PROFINET, PROFIBUS, real-time Ethernet or time-sensitive networking (TSN), are predominantly used for communication between automation devices.

On account of their use for often extremely different applications, problems may arise in Ethernet-based communication networks, for example, if network resources for transmitting data streams or data frames with real-time requirements are used in competition for transmitting data frames with a large useful data content without special quality of service requirements. This may result in data streams or data frames with real-time requirements not being transmitted according to a requested or required quality of service.

WO 2019/001718 A1 describes a data transmission method that makes it possible to combine protected communication and a low level of network configuration effort. Here, at least two paths that are redundant, at least in sections, are reserved when reserving resources for transmitting data streams (streams) from a transmitter to a receiver. Duplicate filters at network nodes assigned to redundant path sections are automatically configured while reserving resources by extending a reservation protocol.

EP 3 674 824 A1 discloses a system in which an individual time window within predefined time intervals is respectively specified for data streams that are assigned to selected control applications running on terminals. The time windows each have an individual cycle duration that is a multiple of a general cycle duration or corresponds to the general cycle duration. First and second communication devices each check, for the selected control applications, whether a specified time window for transmitting data is available. If a time window is available, then information relating to a beginning of the time window within the predefined time intervals is respectively transmitted to the terminal on which the respective selected control application executes. Data streams that are assigned to selected control applications are each transmitted in a manner corresponding to the information relating to the beginning of the individual time window.

WO 2017/064560 A1 describes a method for providing centralized management of a software-defined automation system (SDA system). The SDA system comprises capturing controller nodes and capturing computing nodes in a logically centralized but nevertheless physically distributed manner by monitoring activities of the computing nodes. Here, execution, network and security environments within the SDA system can be monitored by system components to detect critical events in a predefined environment. At least one component in the predefined environment is corrected in response to a detected critical event. A correction within the predefined environment causes at least one component within at least one further environment to be corrected.

In industrial automation systems, control applications are usually executed in real-time systems, such as programmable logic controllers, so that a deterministic sequence of the control applications can be ensured. During a program cycle, measurement and/or state variables are initially requested from a controlled or regulated process as input signals. Manipulated variables are then determined as output signals by the control applications based on the requested input signals. Finally, the output signals are transmitted to devices to be controlled or regulated via ideally real-time-capable communication systems.

However, in virtualized control systems or operating systems without real-time extensions, control applications do not have direct access to hardware and the sequence control environment. Therefore, no immediate execution of control commands can be enforced, for example. In particular, it is possible, in virtualized control systems or operating systems without real-time extensions, for a high-priority control application to be executed in a manner displaced or delayed by another application. This can occur, for example, when two control applications that simultaneously require exclusive access to the same resource are running in a virtualized environment.

SUMMARY OF THE INVENTION

It is an object of the present invention to provide an apparatus and method for providing time-critical control applications within environments, which do not have any real-time capability per se.

This and other object and advantages are achieved in accordance with the invention by a system and method in which control applications are provided via sequence control components that can each be loaded into and executed in a sequence control environment formed via a server device. The control applications each use periodically captured measurement and/or state variables to periodically determine manipulated variables for a process to be controlled or regulated.

The sequence control components are preferably software containers, Java bytecode or application programs running on operating systems, while the sequence control environment is a container runtime environment, such as a docker engine, a Java virtual machine or an operating system without real-time extensions. In principle, alternative micro-virtualization concepts, such as snaps, can also be used for the sequence control components. Accordingly, the sequence control environment may also comprise a snap core.

Software containers are preferably each configured to execute, in a manner isolated from other software containers or container groups within the sequence control environment, on a host operating system that is installed in the server device. In particular, the software containers each use a kernel of the host operating system of the server device together with other software containers executing on the server device.

In accordance with the invention, a plurality of mutually redundant sequence control components are executed in parallel with one another. In addition, the mutually redundant sequence control components transmit the determined manipulated variables, with the inclusion of a sequence number assigned to the respective process cycle, to actuators and/or control units. Here, the actuators and/or control units identify and accordingly filter duplicates of the transmitted manipulated variables on the basis of the sequence numbers. In addition, provision may be made for the mutually redundant sequence control components to determine the manipulated variables for a respective process cycle following a respective capture time of the measurement and/or state variables as soon as a majority of the mutually redundant sequence control components signal correct presence of the measurement and/or state variables for the respective capture time.

The present invention makes it possible to execute time-critical control applications in sequence control environments that themselves do not have any real-time capability, specifically via the above coordination of mutually redundant sequence control components or via a coordinated, redundant transmission of the determined manipulated variables. As a result, a conventional IT infrastructure can be used to solve control problems that usually require real-time capability. A particularly high level of availability arises if the mutually redundant sequence control components transmit the manipulated variables to the actuators and/or control units via disjoint paths or if the manipulated variables are each transmitted to mutually redundant control units.

In accordance with the invention, the mutually redundant sequence control components each consistently subscribe to data streams containing the periodically captured measurement and/or state variables. This makes it possible to ensure that the mutually redundant sequence control components operate with a consistent process image. The data streams containing the periodically captured measurement and/or state variables are preferably announced by respective data sources or sensors, in each case via data stream announcements, and are transmitted to a multicast address assigned to sequence control components subscribing to the respective data stream.

In addition, the measurement and/or state variables are transmitted in accordance with the invention, with the inclusion of a sequence number assigned to the respective capture time, to the mutually redundant sequence control components. Here, the mutually redundant sequence control components transmit the determined manipulated variables to the actuators and/or control units via data streams. The same sequence numbers used to transmit the determined manipulated variables for the respective process cycle following the respective capture time of the measurement and/or state variables are used to transmit the measurement and/or state variables for the respective capture time. This makes it possible to efficiently use stochastic properties of distributed systems, in combination with communication system functions for the deterministic and redundant transmission of data streams, to enable a stochastic determinism for the control applications.

Quality of service requirements are specified in accordance with the invention for transmitting the data streams. According to these quality of service requirements, resources for transmitting the data streams are reserved in communication devices forwarding the data streams, such as switches, bridges or routers. In the event of sufficient availability, these resources are reserved in the communication devices forwarding the data streams and comprise usable transmission time windows, bandwidth, assured maximum latency, queue number, queue cache and/or address cache in switches or bridges.

In accordance with one particularly preferred embodiment of the present invention, the communication devices forwarding the data streams are connected to one another via a time-sensitive network, in particular in accordance with Institute of Electrical and Electronics Engineers (IEEE) 802.3, IEEE 802.1Q, IEEE 802.1AB, IEEE 802.1AS, IEEE 802.1BA and/or IEEE 802.1CB. Accordingly, forwarding of the data streams can be controlled by means of frame preemption, in particular in accordance with IEEE 802.1Q, time-aware shaper, in particular in accordance with IEEE 802.1Q, credit-based shaper, in particular in accordance with IEEE 802.1Q, burst limiting shaper, peristaltic shaper and/or priority-based shaper. This makes it possible to resort to tried-and-tested communication system functions for the deterministic and redundant transmission of data streams, which communication system functions can be implemented reliably.

The mutually redundant sequence control components advantageously signal the correct presence of the measurement and/or state variables for the respective capture time, in each case via a confirmation message to the other redundant sequence control components. In addition, if the measurement and/or state variables are present in the majority of the mutually redundant sequence control components in a delayed and/or incorrect manner, then an error is signaled and/or the manipulated variables determined last are transmitted again. This also ensures a defined system behavior in cases of errors. For example, the measurement and/or state variables are present in a delayed manner if they are not received by the sequence control components within a permissible latency as of the respective capture time.

The system in accordance with the invention for providing time-critical control applications is suitable for implementing a method in accordance with preceding embodiments and comprises a plurality of server devices, a plurality of sequence control environments formed via the server devices and a plurality of sequence control components for providing the control applications. The sequence control components can each be loaded into and executed in a sequence control environment formed via a server device. Here, the control applications are configured to each use periodically captured measurement and/or state variables to periodically determine manipulated variables for a process to be controlled or regulated.

The sequence control components of the system in accordance with the invention are configured to be executed in parallel with one another as mutually redundant sequence control components, to each consistently subscribe to data streams containing the periodically captured measurement and/or state variables and to transmit the determined manipulated variables to actuators and/or control units via data streams. Accordingly, the system in accordance with the invention is configured such that quality of service requirements are specified for transmitting the data streams and the measurement and/or state variables are transmitted, with the inclusion of a sequence number assigned to a respective capture time, to the mutually redundant sequence control components.

In addition, the sequence control components are configured to transmit the determined manipulated variables, with the inclusion of a sequence number assigned to the respective process cycle, to the actuators and/or control units. Accordingly, the actuators and/or control units are configured to identify and filter duplicates of the transmitted manipulated variables based on the sequence numbers. Furthermore, the system in accordance with the invention is also configured such that the same sequence numbers as are used to transmit the determined manipulated variables for the respective process cycle following the respective capture time of the measurement and/or state variables are used to transmit the measurement and/or state variables for the respective capture time. In addition, the system is configured such that resources for transmitting the data streams are reserved in communication devices forwarding the data streams in accordance with the quality of service requirements in the event of sufficient availability. Here, the resources comprise usable transmission time windows, bandwidth, assured maximum latency, queue number, queue cache and/or address cache in switches or bridges.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawings, in which.

DETAILED DESCRIPTION OF THE EXEMPLARY EMBODIMENTS

Figure 1:
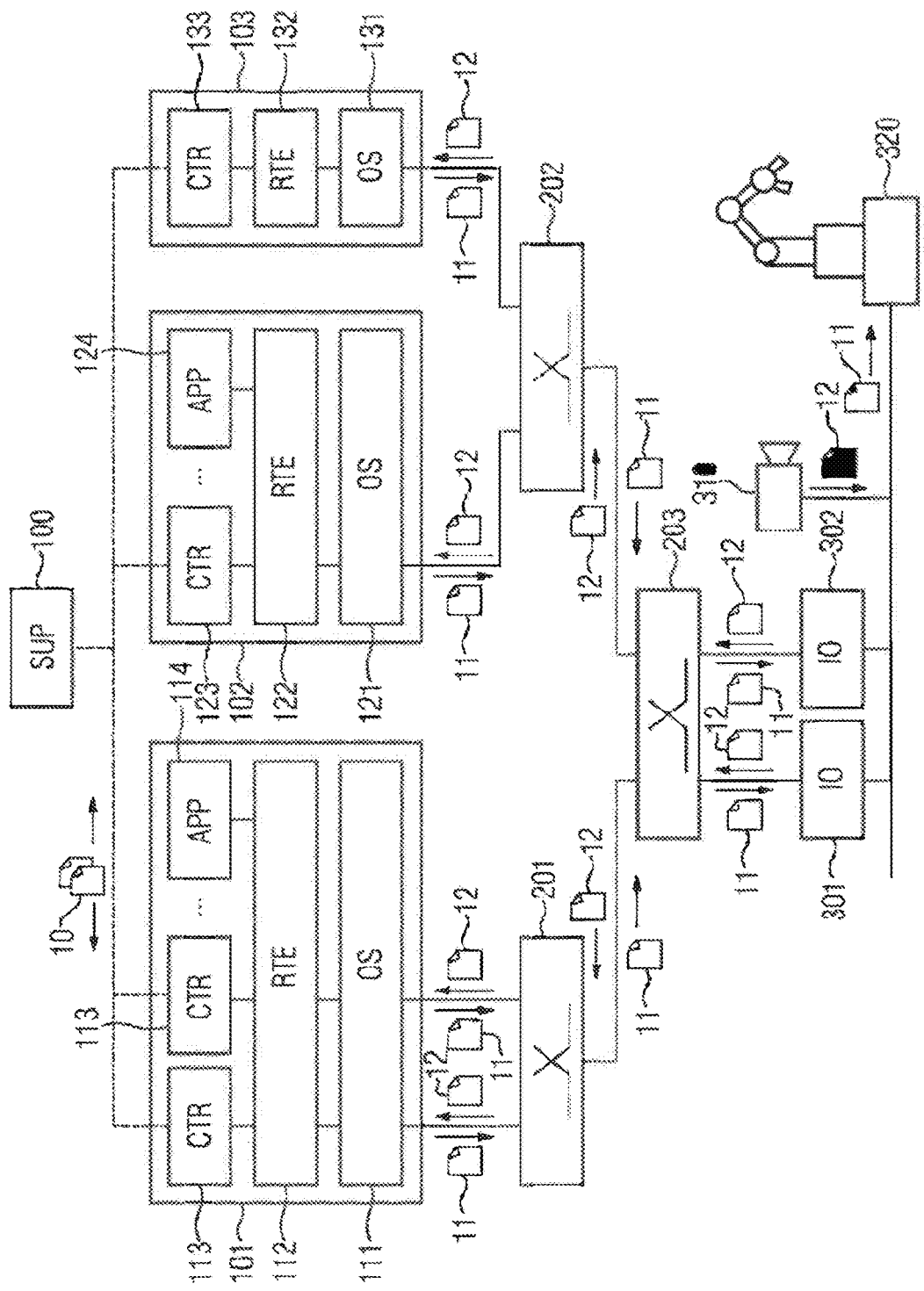
FIG. 1 shows a system for providing time-critical control applications in accordance with the invention.

The system illustrated in FIG. 1 comprises a plurality of server devices 101, 102, 103 for providing control applications of an industrial automation system. The control applications of the industrial automation system are examples of time-critical services and can also comprise monitoring functions. In the present exemplary embodiment, the server devices 101, 102, 103 are connected to two mutually redundant input/output units 301-302, which are used as control units for connected sensors and actuators, via a communication network comprising a plurality of switches 201, 202, 203. For example, a camera system 310 as a sensor and a machine controlled by the above-mentioned control applications as an actuator may be connected to the input/output units 301-302.

The switches 201, 202, 203 are configured, in particular, to forward data streams via a time-sensitive network in accordance with IEEE 802.3, IEEE 802.1Q, IEEE 802.1AB, IEEE 802.1AS, IEEE 802.1BA and IEEE 802.1CB. Here, the forwarding of the data streams can be controlled, for example, via frame preemption in accordance with IEEE 802.1Q, time-aware shaper in accordance with IEEE 802.1Q, credit-based shaper in accordance with IEEE 802.1Q, burst limiting shaper, peristaltic shaper or priority-based shaper.

The server devices 101, 102, 103 can use the control applications to implement, for example, functions of control devices of an industrial automation system, such as programmable logic controllers. In this manner, the server devices 101, 102, 103 can be used, in particular, to exchange control and measurement variables with machines or apparatuses controlled by the server devices 101, 102, 103. Here, the server devices 101, 102, 103 can use captured measurement variables or observed state variables to determine suitable manipulated variables for the machines or apparatuses.

Alternatively or additionally, the server devices 101, 102, 103 can use the control applications to implement functions of operating and observation stations and can therefore be used to visualize process data and/or measurement and control variables that are processed or captured by automation devices. In particular, the server devices 101, 102, 103 can be used to display values of a control loop and to change regulating parameters or programs.

In the server devices 101, 102, 103, the control applications are each provided via sequence control components 113, 123, 133 that can be loaded into and executed in a sequence control environment 112, 122, 132 formed via the respective server device 101, 102, 103. The sequence control environments 112, 122, 132 are each installed as an application on a host operating system 111, 121, 131 of the respective server device 101, 102, 103. In addition, sequence control components 114, 124 for non-time-critical application programs can also be executed within the sequence control environments.

In the present exemplary embodiment, the sequence control components 113-114, 123-124, 133 are or comprise software containers that each execute, in a manner isolated from other software containers, container groups or pods within the sequence control environments 112, 122, 132, on the respective host operating system 111, 121, 131. Here, the software containers each use a kernel of the respective host operating system 111, 121, 131 together with other software containers running on the respective server device 101, 102, 103. The sequence control environments 112, 122, 132 are preferably container runtime environments or container engines. According to alternative embodiments, the sequence control components 113-114, 123-124, 133 may comprise Java bytecode or application programs running on operating systems, whereas the sequence control environments 112, 122, 132 are each a Java virtual machine or an operating system without real-time extensions here.

Isolation of the sequence control components or isolation of selected operating system resources from one another can be achieved, in particular, via control groups and namespacing. Control groups can be used to define process groups to restrict available resources for selected groups. Namespaces can be used to isolate or hide individual processes or control groups from other processes or control groups.

The control applications each use periodically captured measurement and/or state variables 12 to periodically determine manipulated variables 11 for a process to be controlled or regulated. For this purpose, a plurality of mutually redundant sequence control components 113, 123, 133 are executed in parallel with one another. In the present exemplary embodiment, the mutually redundant sequence control components 113, 123, 133 each consistently subscribe to data streams containing the periodically captured measurement and/or state variables 12, which can come from the camera system 310, in particular. The data streams containing the periodically captured measurement and/or state variables are announced by respective data sources and/or sensors 310, in each case via data stream announcements, such as talker advertise, and are transmitted to a multicast address assigned to sequence control components 113, 123, 133 subscribing to the respective data stream.

In order to transmit the data streams, quality of service requirements may be specified, in particular, at the talker or listener end, with the result that resources for transmitting the data streams are reserved in communication devices forwarding the data streams, such as the switches 201, 202, 203, in accordance with the quality of service requirements. This presupposes that sufficient resources are available in the communication devices forwarding the data streams. Here, the resources comprise, for example, usable transmission time windows, bandwidth, assured maximum latency, queue number, queue cache and/or address cache in switches or bridges.

The mutually redundant sequence control components 113, 123, 133 determine the manipulated variables 11 for a respective process cycle following a respective capture time of the measurement and/or state variables 12 as soon as a majority of the mutually redundant sequence control components signal correct presence of the measurement and/or state variables 12 for the respective capture time. In the present exemplary embodiment, the mutually redundant sequence control components 113, 123, 133 signal the correct presence of the measurement and/or state variables 12 for the respective capture time, in each case via a confirmation message 10 to the other redundant sequence control components.

If the measurement and/or state variables 12 are present in the majority of the mutually redundant sequence control components 113, 123, 133 in a delayed or incorrect manner, then an error can be signaled or the manipulated variables 11 determined last can be transmitted again. The measurement and/or state variables are present in a delayed manner if they are not received by the sequence control components within a permissible latency as of the respective capture time.

Alternatively or additionally, the mutually redundant sequence control components 113, 123, 133 transmit the determined manipulated variables 11, with the inclusion of a sequence number assigned to the respective process cycle, to actuators 320 and/or control units 31-32. This can be performed, in particular, irrespective of whether and/or when the measurement and/or state variables 12 for the respective capture time are correctly present in the majority of the mutually redundant sequence control components 113, 123, 133. The actuators 320 and/or control units 31-32 can identify and filter duplicates of the transmitted manipulated variables 11 based on the sequence numbers. Such filtering of duplicates can also be implemented by the switches 201, 202, 203 after the manipulated variables 11 have been forwarded via partially disjoint paths. The measurement and/or state variables 12 are preferably transmitted, with the inclusion of a sequence number assigned to the respective capture time, to the mutually redundant sequence control components 113, 123, 133 via the data streams that have been subscribed to. Correspondingly, the mutually redundant sequence control components 113, 123, 133 transmit the determined manipulated variables 11 to the actuators 320 and/or control units 31-32 via data streams. Here, the same sequence numbers as are used to transmit the determined manipulated variables 11 for the respective process cycle following the respective capture time of the measurement and/or state variables 12 are used to transmit the measurement and/or state variables 12 for the respective capture time.

In order to filter duplicates, a size or depth of a duplicate filters can be defined based on a maximum variance of frame or packet transit times when transmitting the manipulated variables 11. In addition, it is possible to take into account a minimum interval length, with which the measurement and/or state variables 12 are periodically transmitted by the respective data sources and/or sensors 310. A variance of minimum and maximum transit times using duplicates of manipulated variables 11, which are transmitted by mutually redundant sequence control components 113, 123, 133, can be determined relatively easily at merging points, for example, at the switches 201, 202, 203. In particular, functions for minimizing jitter can be used in deterministic communication networks at the merging points. Reduced jitter can be achieved via specific delays when transmitting the manipulated variables 11 or the measurement and/or state variables 12.

In accordance with one particularly preferred embodiment, a supervisor 100 is provided for using redundant data transmission, using asynchronous communication, diagnosing distributed systems and coordinating the mutually redundant sequence control components 113, 123, 133. Redundant sequence control components can be added or removed, for example, via the supervisor. Removing sequence control components from a cluster of redundant sequence control components is appropriate, in particular, when a sequence control component receives or processes required measurement and/or state variables in a delayed manner. This makes it possible to reduce latencies and jitter.

Figure 2:
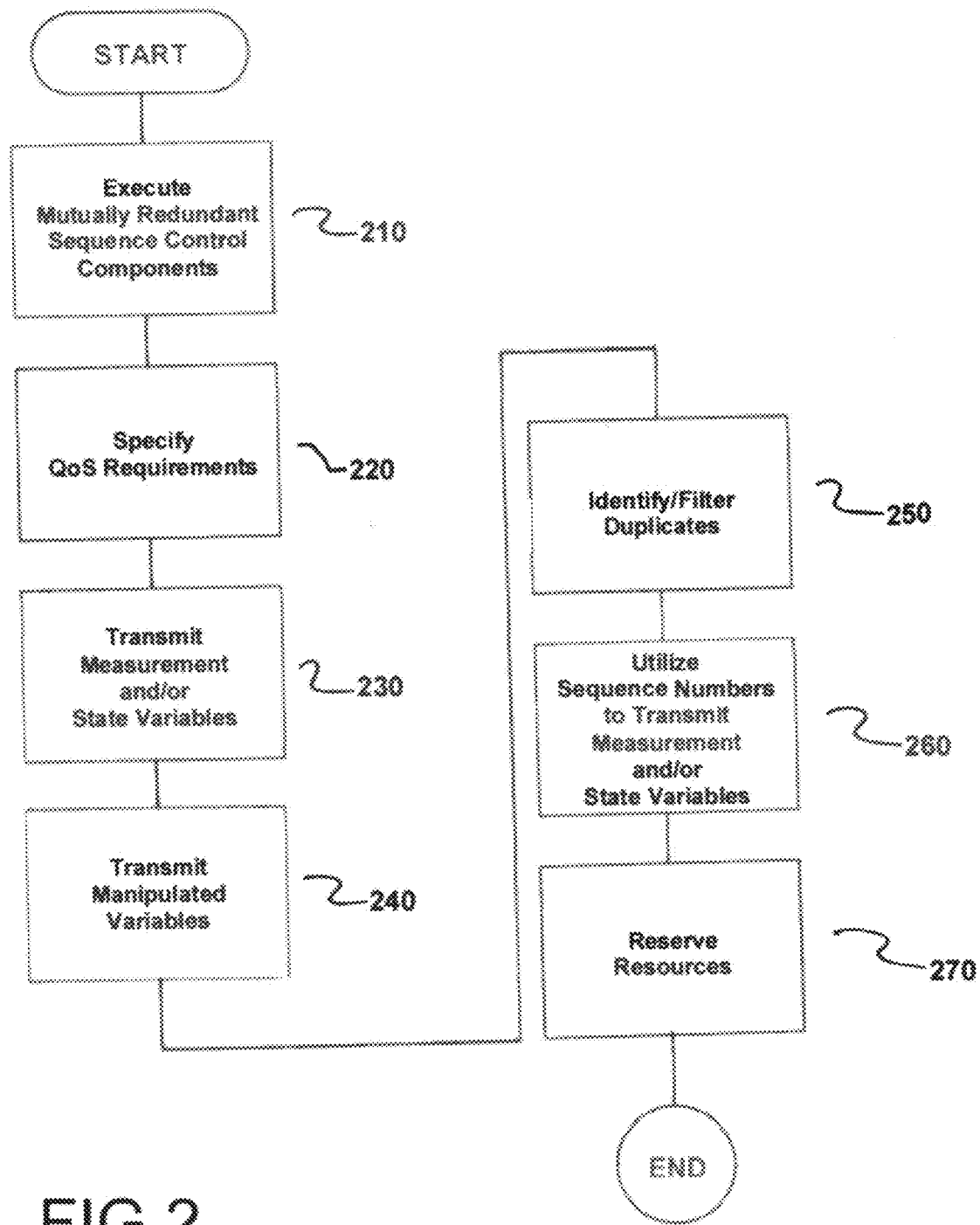
FIG. 2 is a flowchart of the method in accordance with the invention.

FIG. 2 is a flowchart of the method for providing time-critical control applications via sequence control components 113, 123, 133 that are each loadable into and executable in a sequence control environment 112, 122, 132 formed via a server device 101, 10, 103, where the time-critical control applications each utilizing periodically captured measurement and/or state variables 12 to periodically determine manipulated variables 11 for a process to be controlled or regulated.

The method comprises executing a plurality of mutually redundant sequence control components 113, 123, 133 in parallel with one another, as indicated in step 210. Here, of the mutually redundant sequence control components 113, 123, 133 consistently subscribe to data streams containing the periodically captured measurement and/or state variables 12 and transmit the determined manipulated variables to actuators and/or control units via data streams.

Next, quality of service requirements for transmitting the data streams are specified, as indicated in step 220.

Next, the measurement and/or state variables are transmitted to the mutually redundant sequence control components, as indicated in step 230. Here, a sequence number assigned to a respective capture time is included in the transmittal.

Next, the mutually redundant sequence control components 113, 123, 133 transmit the determined manipulated variables 11 to the actuators 320 and/or control units 31-32, as indicated in step 240. Here, the sequence number assigned to the respective process cycle are also included in the transmittal.

Next, the actuators 320 and/or control units 31-32 are used to identify and filter duplicates of the transmitted manipulated variables 11 based on the sequence numbers, as indicated in step 250.

Next, the same sequence numbers used to transmit the determined manipulated variables for the respective process cycle following the respective capture time of the measurement and/or state variables are used to transmit the measurement and/or state variables for the respective capture time, as indicated in step 260.

Next, resources for transmitting the data streams in communication devices forwarding the data streams in accordance with the quality of service requirements in an event of sufficient availability are reserved, as indicated in step 270. In accordance with the inventive method, the resources comprise usable transmission time windows, bandwidth, assured maximum latency, queue number, queue cache and/or address cache in switches or bridges.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing time-critical control applications via sequence control components which are each loadable into and executable in a sequence control environment formed via a server device, the time-critical control applications each utilizing periodically captured measurement and/or state variables to periodically determine manipulated variables for a process to be controlled or regulated, the method comprising:
    executing a plurality of mutually redundant sequence control components in parallel with one another, each plurality of mutually redundant sequence control components consistently subscribing to data streams containing the periodically captured measurement and/or state variables and transmitting the determined manipulated variables to at least one of actuators and control units via data streams;
    specifying quality of service requirements for transmitting the data streams;
    transmitting the measurement and/or state variables to the mutually redundant sequence control components, a sequence number assigned to a respective capture time being included;
    transmitting, by the mutually redundant sequence control components, the determined manipulated variables to at least one of the actuators and control units, the sequence number assigned to the respective process cycle being included;
    identifying and filtering, by at least one of the actuators and control units, duplicates of the transmitted manipulated variables based on the sequence numbers;
    utilizing the same sequence numbers used to transmit the determined manipulated variables for the respective process cycle following the respective capture time of the measurement and/or state variables to transmit the measurement and/or state variables for the respective capture time; and
    reserving resources for transmitting the data streams in communication devices forwarding the data streams in accordance with the quality of service requirements in an event of sufficient availability;
    wherein the resources comprise at least one of usable transmission time windows, bandwidth, assured maximum latency, queue number, queue cache and address cache in switches or bridges.

2. The method as claimed in claim 1, wherein the data streams containing the periodically captured measurement and/or state variables are each announced by respective data sources and/or sensors via data stream announcements, and are each transmitted to a multicast address assigned to sequence control components subscribing to the respective data stream.

3. The method as claimed in claim 2, wherein the communication devices forwarding the data streams are interconnected via a time-sensitive network.

4. The method as claimed in claim 3, wherein the time-sensitive network is in accordance with at least one of Institute of Electrical and Electronics Engineers (IEEE) 802.3, IEEE 802.1Q, IEEE 802.1AB, IEEE 802.1AS, IEEE 802.1BA and IEEE 802.1CB.

5. The method as claimed in claim 1, wherein the communication devices forwarding the data streams are interconnected via a time-sensitive network.

6. The method as claimed in claim 5, wherein the time-sensitive network is in accordance with at least one of Institute of Electrical and Electronics Engineers (IEEE) 802.3, IEEE 802.1Q, IEEE 802.1AB, IEEE 802.1AS, IEEE 802.1BA and IEEE 802.1CB.

7. The method as claimed in claim 5, wherein forwarding of the data streams is controlled via frame preemption.

8. The method as claimed in claim 7, wherein the frame preemption is in accordance with at least one of Institute of Electrical and Electronics Engineers (IEEE) 802.1Q, time-aware shaper, IEEE 802.1Q, credit-based shaper, IEEE 802.1Q, burst limiting shaper, peristaltic shaper and priority-based shaper.

9. The method as claimed in claim 1, wherein the sequence control components are software containers, Java bytecode or application programs running on operating systems, and wherein the sequence control environment is a container runtime environment, a Java virtual machine or an operating system without real-time extensions.

10. The method as claimed in claim 1, wherein the mutually redundant sequence control components transmit the manipulated variables to at least one of the actuators and control units via disjunct paths.

11. The method as claimed in claim 1, wherein the manipulated variables are each transmitted to mutually redundant control units.

12. The method as claimed in claim 1, wherein the mutually redundant sequence control components each signal a correct presence of the measurement and/or state variables for the respective capture time via a confirmation message to the other redundant sequence control components.

13. The method as claimed in claim 1, wherein at least one of an error is signaled and the manipulated variables determined last are retransmitted, if the measurement and/or state variables are present in a majority of the mutually redundant sequence control components in a delayed and/or incorrect manner.

14. The method as claimed in claim 13, wherein the measurement and/or state variables are present in a delayed manner if they are not received by the sequence control components within a permissible latency as of the respective capture time.

15. A system for providing time-critical control applications, comprising:
- a plurality of server devices;
- a plurality of sequence control environments formed via the server devices; and
- a plurality of sequence control components for providing the control applications, each of the plurality of sequence control components being loadable into and executable in a sequence control environment formed via a server device;
- wherein the control applications are configured to each use periodically captured measurement and/or state variables to periodically determine manipulated variables for a process to be controlled or regulated;
- wherein the sequence control components are configured to be executed in parallel with one another as mutually redundant sequence control components, to each consistently subscribe to data streams containing the periodically captured measurement and/or state variables and to transmit the determined manipulated variables to at least one of actuators and control units via data streams;
- wherein the system is configured such that quality of service requirements are specified for transmitting the data streams and the measurement and/or state variables are transmitted to the mutually redundant sequence control components, a sequence number assigned to a respective capture time being include;
- wherein the sequence control components are configured to transmit the determined manipulated variables to at least one of the actuators and control units, the sequence number assigned to the respective process cycle being included;
- wherein at least one of the actuators and control units are configured to identify and filter duplicates of the transmitted manipulated variables based on the sequence numbers;
- wherein the system is further configured such that the same sequence numbers used to transmit the determined manipulated variables for the respective process cycle following the respective capture time of the measurement and/or state variables are also used to transmit the measurement and/or state variables for the respective capture time;
- wherein the system is further configured such that resources for transmitting the data streams are reserved in communication devices forwarding the data streams in accordance with the quality of service requirements in an event of sufficient availability; and
- wherein the resources comprise at least one of usable transmission time windows, bandwidth, assured maximum latency, queue number, queue cache and address cache in switches or bridges.

* * * * *